United States Patent
Sah

(10) Patent No.: US 7,908,063 B2
(45) Date of Patent: Mar. 15, 2011

(54) SYNCHRONOUS SHIFT EXECUTION FOR HYBRID TRANSMISSION

(75) Inventor: Jy-Jen F. Sah, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 835 days.

(21) Appl. No.: 11/417,098

(22) Filed: May 3, 2006

(65) Prior Publication Data

US 2007/0260381 A1 Nov. 8, 2007

(51) Int. Cl.
*G06F 7/00* (2006.01)
*G06F 17/00* (2006.01)
*H02P 7/00* (2006.01)

(52) U.S. Cl. .............. 701/51; 701/1; 701/52; 701/55; 701/56; 701/58; 701/61; 701/62; 701/64; 477/3; 477/5; 477/6; 477/7; 477/8; 477/14; 477/15; 477/16; 477/17; 180/65.1; 180/65.21; 180/65.235; 180/65.6; 180/65.7

(58) Field of Classification Search .......... 701/1, 51–52, 701/55–62, 64; 477/3–8, 14–17; 180/65.1–65.7
See application file for complete search history.

(56) References Cited

U.S. PATENT DOCUMENTS

| | | | | | |
|---|---|---|---|---|---|
| 5,833,570 | A | * | 11/1998 | Tabata et al. | 477/3 |
| 5,931,757 | A | * | 8/1999 | Schmidt | 475/2 |
| 6,019,699 | A | * | 2/2000 | Hoshiya et al. | 477/20 |
| 6,351,700 | B1 | * | 2/2002 | Muramoto et al. | 701/51 |
| 6,551,208 | B1 | * | 4/2003 | Holmes et al. | 475/5 |
| 6,662,893 | B2 | * | 12/2003 | Fukuda et al. | 180/249 |
| 2005/0080540 | A1 | * | 4/2005 | Steinmetz et al. | 701/55 |
| 2005/0101435 | A1 | * | 5/2005 | Cowan | 477/83 |
| 2005/0182543 | A1 | * | 8/2005 | Sah et al. | 701/51 |
| 2006/0003863 | A1 | * | 1/2006 | Tabata et al. | 477/2 |
| 2008/0004779 | A1 | * | 1/2008 | Sah | 701/51 |

* cited by examiner

*Primary Examiner* — Jack Keith
*Assistant Examiner* — Chuong P Nguyen

(57) ABSTRACT

An apparatus and method are provided to execute synchronous shifting in a powertrain system having multiple torque-generative devices each operable to independently supply motive torque to the transmission device. The exemplary transmission device comprises a two-mode, compound-split, hybrid electro-mechanical transmission. Operation includes operating in an initial fixed gear ratio, operating the transmission in a mode operation, and, operating the transmission in a final fixed gear ratio. The control system reduces reactive torque of a clutch activating the initial gear, and deactivates the first torque-transfer device when the reactive torque is less than a predetermined value. It determines that speed of an input shaft to the transmission is substantially synchronized with a rotational speed of the second torque-transfer device, and actuates the second torque-transfer device.

19 Claims, 4 Drawing Sheets

SYNCHRONOUS SHIFT EXECUTION FOR HYBRID TRANSMISSION

TECHNICAL FIELD

This invention pertains generally to hybrid powertrain control systems, and more specifically to executing transmission shifts.

BACKGROUND OF THE INVENTION

Various hybrid powertrain architectures are known for managing the input and output torques of various prime-movers in hybrid vehicles, most commonly internal combustion engines and electric machines. One such hybrid powertrain architecture comprises a two-mode, compound-split, electro-mechanical transmission which utilizes an input member for receiving power from a prime mover power source and an output member for delivering power from the transmission. First and second motor/generators are operatively connected to an energy storage device for interchanging electrical power between the storage device and the first and second motor/generators. A control unit is provided for regulating the electrical power interchange between the energy storage device and the first and second motor/generators. The control unit also regulates electrical power interchange between the first and second motor/generators.

Engineers implementing powertrain systems including transmission systems are tasked with developing gear shifting schemes. An ongoing challenge with any shifting scheme is to have a gear shift event which may be discernible to an operator, but not displeasing. Furthermore, engineers must be cognizant of thermal energy generated during clutch slippage, and effect of such thermal energy on transmission performance and durability.

Therefore, there is a need to for a method and apparatus to execute a synchronous shift in gears in a hybrid transmission.

SUMMARY OF THE INVENTION

In order to address the concerns raised hereinabove, a method and an article of manufacture are provided to execute a synchronous shift from an initial gear to a final gear in a transmission of a powertrain system. The exemplary powertrain system comprises a plurality of torque-generative devices each operable to supply motive torque to the transmission device and vehicle driveline, and the exemplary transmission device comprises a two-mode, compound-split, hybrid electro-mechanical transmission having four fixed gear ratios. There is a plurality of gears operable to transmit torque between the transmission device and an output shaft using a plurality of torque-transfer devices. The torque-generative devices preferably comprise a pair of electric motor/generators and an internal combustion engine. Torque transmission can be in the form of transmitting motive torque from one of the torque-generative devices through the transmission to the vehicle driveline. Torque transmission can be in the form of transmitting wheel torque resulting from vehicle momentum, through the transmission to one of the torque generative devices, in order to transmit torque to effect electrical generation using one of the electrical motor/generators, or to transmit torque to the internal combustion engine to effect engine braking. The article of manufacture includes a control system, comprising in part a storage medium having a computer program encoded therein for effecting the method to execute the shift from initial gear to final gear. The control system utilizes embedded controllers and executes computer programs to generate commands for controlling actuators, to achieve the desired or intended result.

Overall the method executed in the control system includes operating the transmission in the initial fixed gear ratio, operating the transmission in a mode operation, and, operating the transmission in the final fixed gear ratio.

An aspect of the invention comprises the control system operable to reduce reactive torque of a first torque-transfer device activating the initial gear, and deactivate the first torque-transfer device when the reactive torque is less than a predetermined value. It determines that speed of an input shaft to the transmission is substantially synchronized with a rotational speed of the second torque-transfer device, and actuates the second torque-transfer device.

The invention further comprises actuating the second torque-transfer device by increasing torque capacity of the second torque-transfer device; and, increasing a reactive torque of the second torque-transfer device.

Another aspect of the invention comprises increasing torque capacity of the second torque-transfer device by commanding fluid flow through a hydraulic system to actuate the second torque-transfer device at a time prior to a time when the speed of the input shaft is substantially synchronized with the rotational speed of the second torque-transfer device.

Another aspect of the invention comprises determining a time when the speed of the input shaft is to be substantially synchronized with rotational speed of the second torque-transfer device based upon a change in rotational speed of the second torque-transfer device, and, a response time of the hydraulic system.

Another aspect of the invention comprises increasing torque capacity of the second torque-transfer device by actuating a clutch control solenoid operable to actuate the second torque transfer device.

Another aspect of the invention comprises supplying motive torque to the transmission from the first and the second electric motors that is substantially equal to the reactive torque; and, reducing torque capacity of the first torque transfer device to a torque value that is less than a predetermined reactive torque value.

Another aspect of the invention comprises shifting from an initial gear to a final gear in the transmission predicated upon a change in operator demand for output torque.

Another aspect of the invention comprises shifting from an initial gear to a final gear in the transmission predicated upon a change in external conditions.

Another aspect of the invention comprises shifting from an initial gear to a final gear in the transmission predicated upon a change in powertrain torque demand caused by a controller command to change operating mode of one of the torque-generative devices between an electrical energy generating mode and a torque generating mode, when the torque-generative device comprises a motor/generator.

An aspect of the invention includes transitioning from the initial fixed gear ratio to the mode operation when a reactive torque of one of the torque-transfer devices actuating the initial fixed gear ratio is less than a predetermined reactive torque value, wherein the torque-transfer device having the reactive torque less than the predetermined reactive torque value is deactivated. The predetermined reactive torque value comprises a torque value substantially equal to a nil torque value in the embodiment disclosed.

A further aspect of the invention comprises transitioning from mode operation to the final fixed gear ratio when rotational speed of a torque-transfer device necessary for operation in the final fixed gear ratio is substantially synchronized with an input speed to the transmission.

Another aspect of the invention comprises determining speed of an input shaft to the transmission is substantially synchronized with a rotational speed of the second torque-transfer device; and, actuating the second torque-transfer device thereafter.

Another aspect of the invention comprises actuating the second torque-transfer device, including commanding flow of hydraulic actuating fluid to the second torque-transfer device immediately prior to determining the speed of the input shaft is substantially synchronized with the rotational speed of the second torque-transfer device. Torque capacity of the second torque-transfer device is increased therefrom, as is reactive torque of the second torque-transfer device.

Another aspect of the invention comprises commanding flow of hydraulic actuating fluid to the second torque-transfer device immediately prior to determining speed of the input shaft is substantially synchronized with rotational speed of the second torque-transfer device. This includes monitoring rotational speed of the second torque-transfer device. The control system is operable to determine that the speed of the input shaft is substantially synchronized with rotational speed of the second torque-transfer device based upon a change in rotational speed of the second torque-transfer device, and, a hydraulic system fill time.

Another aspect of the invention comprises reducing motive torque supplied to the transmission from the first and second electric motors subsequent to actuating the second torque-transfer device.

These and other aspects of the invention will become apparent to those skilled in the art upon reading and understanding the following detailed description of the embodiments.

BRIEF DESCRIPTION OF THE DRAWINGS

The invention may take physical form in certain parts and arrangement of parts, the preferred embodiment of which will be described in detail and illustrated in the accompanying drawings which form a part hereof, and wherein.

DETAILED DESCRIPTION OF THE PREFERRED EMBODIMENT

Figure 1:
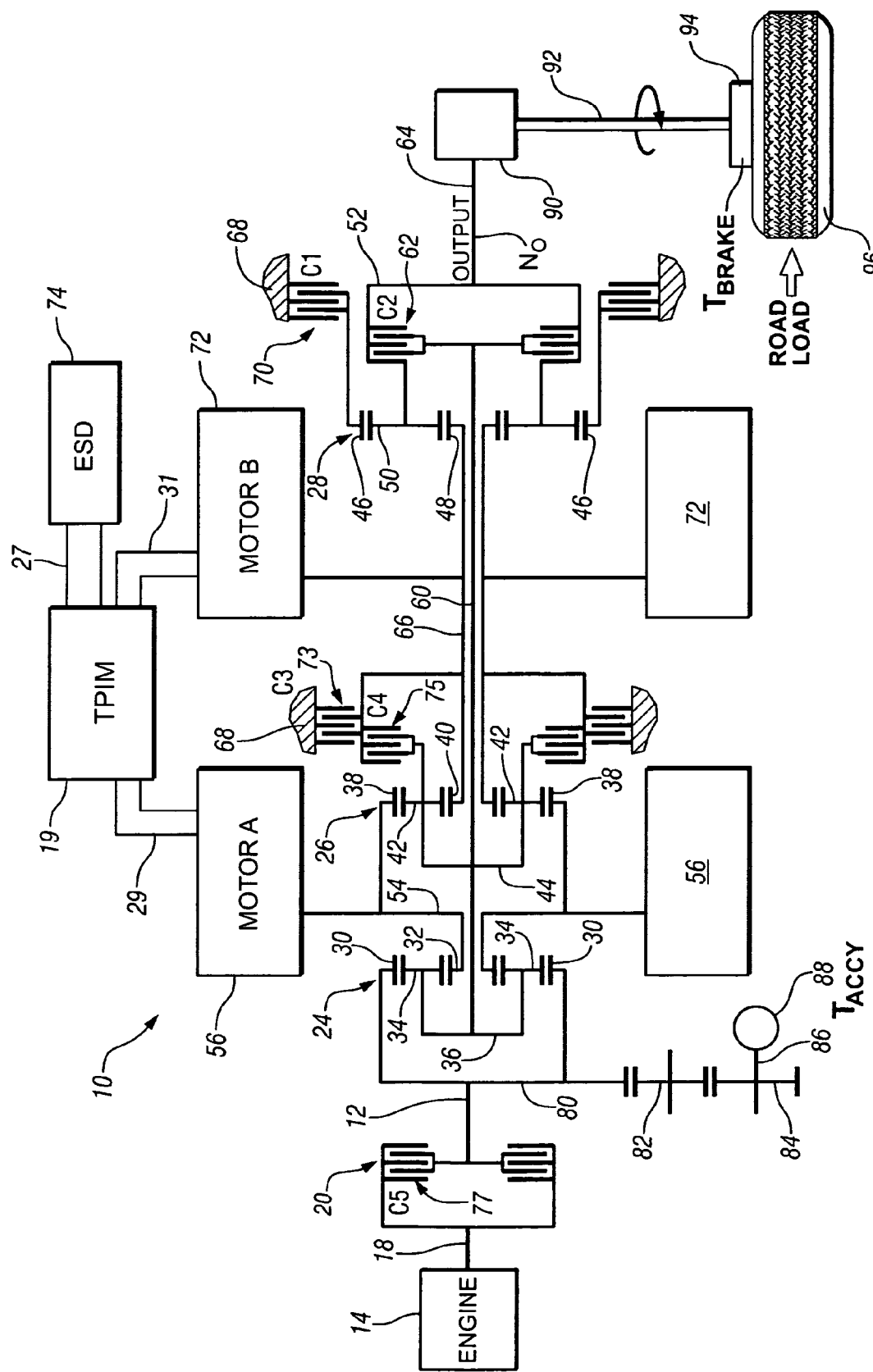
FIG. 1 is a schematic diagram of an exemplary powertrain, in accordance with the present invention.
Figure 2:
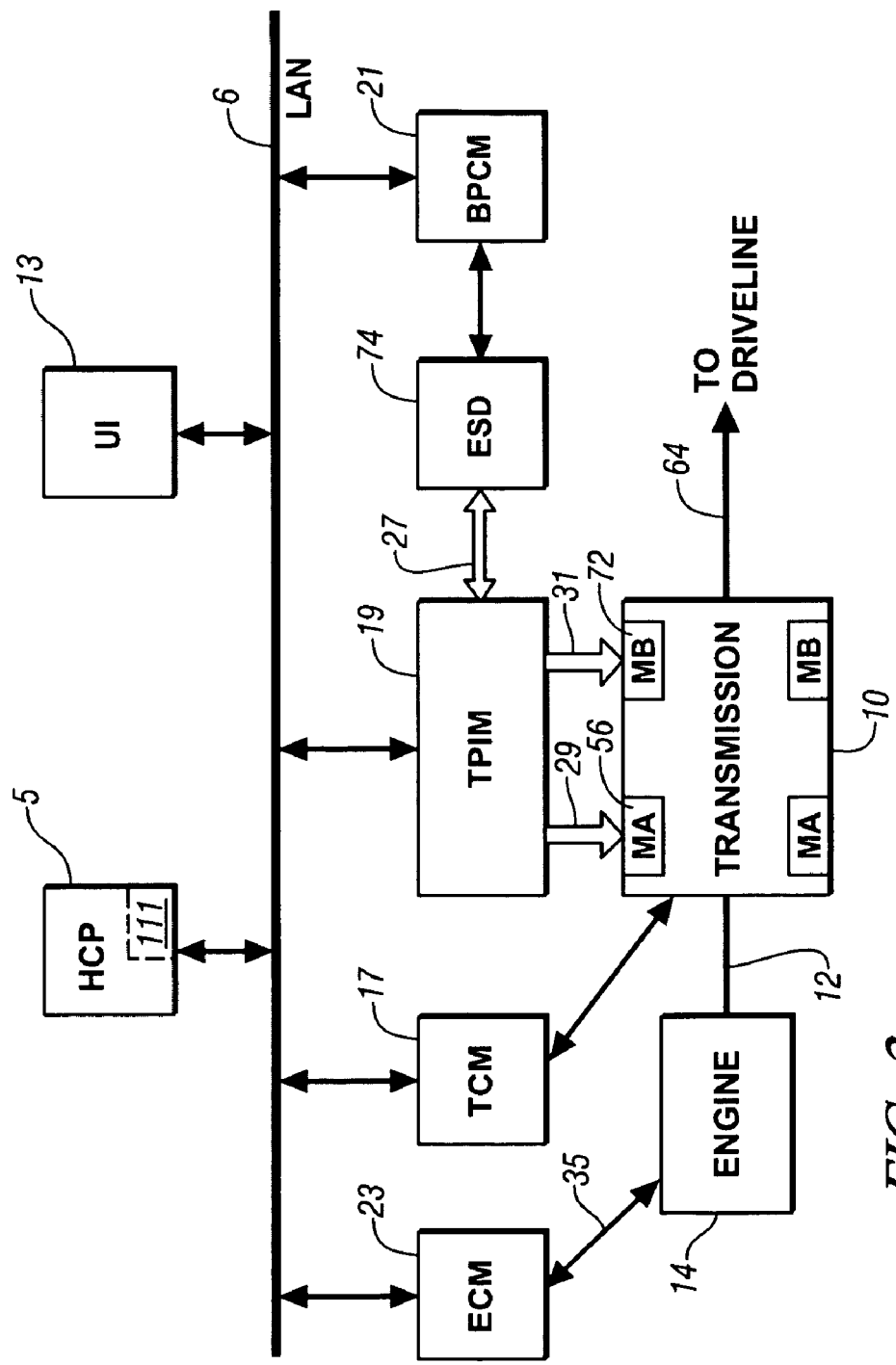
FIG. 2 is a schematic diagram of an exemplary architecture for a controller and powertrain, in accordance with the present invention.

Referring now to the drawings, wherein the showings are for the purpose of illustrating the invention only and not for the purpose of limiting the same, FIGS. 1 and 2 show a system comprising an engine 14, transmission 10, control system, and driveline which has been constructed in accordance with an embodiment of the present invention.

Mechanical aspects of exemplary transmission 10 are disclosed in detail in commonly assigned U.S. Patent Application Publication No. U.S. 2005/0137042 A1, published Jun. 23, 2005, entitled Two-Mode, Compound-Split, Hybrid Electro-Mechanical Transmission having Four Fixed Ratios, which is incorporated herein by reference. The exemplary two-mode, compound-split, electro-mechanical hybrid transmission embodying the concepts of the present invention is depicted in FIG. 1, and is designated generally by the numeral 10. The hybrid transmission 10 has an input member 12 that may be in the nature of a shaft which may be directly driven by an engine 14. A transient torque damper 20 is incorporated between the output shaft 18 of the engine 14 and the input member 12 of the hybrid transmission 10. The transient torque damper 20 preferably comprises a torque transfer device 77 having characteristics of a damping mechanism and a spring, shown respectively as 78 and 79. The transient torque damper 20 permits selective engagement of the engine 14 with the hybrid transmission 10, but it must be understood that the torque transfer device 77 is not utilized to change, or control, the mode in which the hybrid transmission 10 operates. The torque transfer device 77 preferably comprises a hydraulically operated friction clutch, referred to as clutch C5.

The engine 14 may be any of numerous forms of internal combustion engines, such as a spark-ignition engine or a compression-ignition engine, readily adaptable to provide a power output to the transmission 10 at a range of operating speeds, from idle, at or near 600 revolutions per minute (RPM), to over 6,000 RPM. Irrespective of the means by which the engine 14 is connected to the input member 12 of the transmission 10, the input member 12 is connected to a planetary gear set 24 in the transmission 10.

Referring specifically now to FIG. 1, the hybrid transmission 10 utilizes three planetary-gear sets 24, 26 and 28. The first planetary gear set 24 has an outer gear member 30 that may generally be designated as a ring gear, which circumscribes an inner gear member 32, generally designated as a sun gear. A plurality of planetary gear members 34 are rotatably mounted on a carrier 36 such that each planetary gear member 34 meshingly engages both the outer gear member 30 and the inner gear member 32.

The second planetary gear set 26 also has an outer gear member 38, generally designated as a ring gear, which circumscribes an inner gear member 40, generally designated as a sun gear. A plurality of planetary gear members 42 are rotatably mounted on a carrier 44 such that each planetary gear 42 meshingly engages both the outer gear member 38 and the inner gear member 40.

The third planetary gear set 28 also has an outer gear member 46, generally designated as a ring gear, which circumscribes an inner gear member 48, generally designated as a sun gear. A plurality of planetary gear members 50 are rotatably mounted on a carrier 52 such that each planetary gear 50 meshingly engages both the outer gear member 46 and the inner gear member 48.

Ratios of teeth on ring gears/sun gears are typically based upon design considerations known to skilled practitioners and outside the scope of the present invention. By way of example, in one embodiment, the ring gear/sun gear tooth ratio of the planetary gear set 24 is 65/33; the ring gear/sun gear tooth ratio of the planetary gear set 26 is 65/33; and the ring gear/sun gear tooth ratio of the planetary gear set 28 is 94/34.

The three planetary gear sets 24, 26 and 28 each comprise simple planetary gear sets. Furthermore, the first and second planetary gear sets 24 and 26 are compounded in that the inner gear member 32 of the first planetary gear set 24 is conjoined, as through a hub plate gear 54, to the outer gear member 38 of the second planetary gear set 26. The conjoined inner gear member 32 of the first planetary gear set 24 and the outer gear member 38 of the second planetary gear set 26 are continuously connected to a first motor/generator 56, also referred to as 'Motor A'.

The planetary gear sets 24 and 26 are further compounded in that the carrier 36 of the first planetary gear set 24 is conjoined, as through a shaft 60, to the carrier 44 of the second planetary gear set 26. As such, carriers 36 and 44 of the first and second planetary gear sets 24 and 26, respectively, are conjoined. The shaft 60 is also selectively connected to the carrier 52 of the third planetary gear set 28, as through a torque transfer device 62 which, as will be hereinafter more fully explained, is employed to assist in the selection of the operational modes of the hybrid transmission 10. The carrier 52 of the third planetary gear set 28 is connected directly to the transmission output member 64.

In the embodiment described herein, wherein the hybrid transmission 10 is used in a land vehicle, the output member 64 is operably connected to a driveline comprising a gear box 90 or other torque transfer device which provides a torque output to one or more vehicular axles 92 or half-shafts (not shown). The axles 92, in turn, terminate in drive members 96. The drive members 96 may be either front or rear wheels of the vehicle on which they are employed, or they may be a drive gear of a track vehicle. The drive members 96 may have some form of wheel brake 94 associated therewith. The drive members each have a speed parameter, $N_{WHL}$, comprising rotational speed of each wheel 96 which is typically measurable with a wheel speed sensor.

The inner gear member 40 of the second planetary gear set 26 is connected to the inner gear member 48 of the third planetary gear set 28, as through a sleeve shaft 66 that circumscribes shaft 60. The outer gear member 46 of the third planetary gear set 28 is selectively connected to ground, represented by the transmission housing 68, through a torque transfer device 70. Torque transfer device 70, as is also hereinafter explained, is also employed to assist in the selection of the operational modes of the hybrid transmission 10. The sleeve shaft 66 is also continuously connected to a second motor/generator 72, also referred to as 'Motor B'.

All the planetary gear sets 24, 26 and 28 as well as the two motor/generators 56 and 72 are coaxially oriented, as about the axially disposed shaft 60. Motor/generators 56 and 72 are both of an annular configuration which permits them to circumscribe the three planetary gear sets 24, 26 and 28 such that the planetary gear sets 24, 26 and 28 are disposed radially inwardly of the motor/generators 56 and 72. This configuration assures that the overall envelope, i.e., the circumferential dimension, of the transmission 10 is minimized.

A torque transfer device 73 selectively connects the sun gear 40 with ground, i.e., with transmission housing 68. A torque transfer device 75 is operative as a lock-up clutch, locking planetary gear sets 24, 26, motors 56, 72 and the input to rotate as a group, by selectively connecting the sun gear 40 with the carrier 44. The torque transfer devices 62, 70, 73, 75 are all friction clutches, respectively referred to as follows: clutch C1 70, clutch C2 62, clutch C3 73, and clutch C4 75. Each clutch is preferably hydraulically actuated, receiving pressurized hydraulic fluid from a pump. Hydraulic actuation is accomplished using a known hydraulic fluid circuit, which is not described in detail herein.

The hybrid transmission 10 receives input motive torque from a plurality of torque-generative devices, including the engine 14 and the motors/generators 56 and 72, as a result of energy conversion from fuel or electrical potential stored in an electrical energy storage device (ESD) 74. The ESD 74 typically comprises one or more batteries. Other electrical energy and electrochemical energy storage devices that have the ability to store electric power and dispense electric power may be used in place of the batteries without altering the concepts of the present invention. The ESD 74 is preferably sized based upon factors including regenerative requirements, application issues related to typical road grade and temperature, and propulsion requirements such as emissions, power assist and electric range. The ESD 74 is high voltage DC-coupled to transmission power inverter module (TPIM) 19 via DC lines or transfer conductors 27. The TPIM 19 is an element of the control system described hereinafter with regard to FIG. 2. The TPIM 19 communicates with the first motor/generator 56 by transfer conductors 29, and the TPIM 19 similarly communicates with the second motor/generator 72 by transfer conductors 31. Electrical current is transferable to or from the ESD 74 in accordance with whether the ESD 74 is being charged or discharged. TPIM 19 includes the pair of power inverters and respective motor controllers configured to receive motor control commands and control inverter states therefrom for providing motor drive or regeneration functionality.

In motoring control, the respective inverter receives current from the DC lines and provides AC current to the respective motor over transfer conductors 29 and 31. In regeneration control, the respective inverter receives AC current from the motor over transfer conductors 29 and 31 and provides current to the DC lines 27. The net DC current provided to or from the inverters determines the charge or discharge operating mode of the electrical energy storage device 74. Preferably, Motor A 56 and Motor B 72 are three-phase AC machines and the inverters comprise complementary three-phase power electronics.

Referring again to FIG. 1, a drive gear 80 may be presented from the input member 12. As depicted, the drive gear 80 fixedly connects the input member 12 to the outer gear member 30 of the first planetary gear set 24, and the drive gear 80, therefore, receives power from the engine 14 and/or the motor/generators 56 and/or 72 through planetary gear sets 24 and/or 26. The drive gear 80 meshingly engages an idler gear 82 which, in turn, meshingly engages a transfer gear 84 that is secured to one end of a shaft 86. The other end of the shaft 86 may be secured to a hydraulic/transmission fluid pump and/or power take-off ('PTO') unit, designated either individually or collectively at 88, and comprise an accessory load.

Referring now to FIG. 2, a schematic block diagram of the control system, comprising a distributed controller architecture, is shown. The elements described hereinafter comprise a subset of an overall vehicle control architecture, and are operable to provide coordinated system control of the powertrain system described herein. The control system is operable to synthesize pertinent information and inputs, and execute algorithms to control various actuators to achieve control targets, including such parameters as fuel economy, emissions, performance, driveability, and protection of hardware, including batteries of ESD 74 and motors 56, 72. The distributed controller architecture includes engine control module ('ECM') 23, transmission control module ('TCM') 17, battery pack control module ('BPCM') 21, and Transmission Power Inverter Module ('TPIM') 19. A hybrid control module ('HCP') 5 provides overarching control and coordination of the aforementioned controllers. There is a User Interface ('UI') 13 operably connected to a plurality of devices through which a vehicle operator typically controls or directs operation of the powertrain, including the transmission 10. Exemplary vehicle operator inputs to the UI 13 include an accelerator pedal, a brake pedal, transmission gear selector, and, vehicle speed cruise control. Each of the aforementioned controllers communicates with other controllers, sensors, and actuators via a local area network ('LAN') bus 6. The LAN bus 6 allows for structured communication of control parameters and commands between the various controllers. The specific communication protocol utilized is application-specific. By way of example, one communications protocol is the Society of Automotive Engineers standard J1939. The LAN bus and appropriate protocols provide for robust messaging and multi-controller interfacing between the aforementioned controllers, and other controllers providing functionality such as antilock brakes, traction control, and vehicle stability.

The HCP 5 provides overarching control of the hybrid powertrain system, serving to coordinate operation of the ECM 23, TCM 17, TPIM 19, and BPCM 21. Based upon various input signals from the UI 13 and the powertrain, the HCP 5 generates various commands, including: an engine torque command, $T_{E\_CMD}$; clutch torque commands, $T_{CL\_N\_CMD}$ for the various clutches C1, C2, C3, C4 of the hybrid transmission 10; and motor torque commands, $T_{A\_CMD}$ and $T_{B\_CMD}$, for the electrical motors A and B, respectively.

The ECM 23 is operably connected to the engine 14, and functions to acquire data from a variety of sensors and control a variety of actuators, respectively, of the engine 14 over a plurality of discrete lines collectively shown as aggregate line 35. The ECM 23 receives the engine torque command, $T_{E\_CMD}$, from the HCP 5, and generates a desired axle torque, $T_{AXLE\_DES}$, and an indication of actual engine torque, $T_{E\_ACT}$, which is communicated to the HCP 5. For simplicity, ECM 23 is shown generally having bi-directional interface with engine 14 via aggregate line 35. Various other parameters that may be sensed by ECM 23 include engine coolant temperature, engine input speed ($N_E$) to a shaft leading to the transmission, manifold pressure, ambient air temperature, and ambient pressure. Various actuators that may be controlled by the ECM 23 include fuel injectors, ignition modules, and throttle control modules.

The TCM 17 is operably connected to the transmission 10 and functions to acquire data from a variety of sensors and provide command signals to the transmission. Inputs from the TCM 17 to the HCP 5 include estimated clutch torques, $T_{CL\_N\_EST}$, for each of the clutches C1, C2, C3, and, C4 and rotational speed, $N_O$, of the output shaft 64. Other actuators and sensors may be used to provide additional information from the TCM to the HCP for control purposes.

The BPCM 21 is signally connected one or more sensors operable to monitor electrical current or voltage parameters of the ESD 74 to provide information about the state of the batteries to the HCP 5. Such information includes battery state-of-charge, Bat_SOC, and other states of the batteries, including voltage, $V_{BAT}$, and available power, $P_{BAT\_MIN}$ and $P_{BAT\_MAX}$.

The Transmission Power Inverter Module (TPIM) 19 includes a pair of power inverters and motor controllers configured to receive motor control commands and control inverter states therefrom to provide motor drive or regeneration functionality. The TPIM 19 is operable to generate torque commands for Motors A and B, $T_{A\_CMD}$ and $T_{B\_CMD}$, based upon input from the HCP 5, which is driven by operator input through UI 13 and system operating parameters. The predetermined torque commands for Motors A and B, $T_{A\_CMD}$ and $T_{B\_CMD}$, are adjusted with motor damping torques, $T_{A\_DAMP}$ and $T_{B\_DAMP}$, to determine motor torques, $T_A$ and $T_B$, which are implemented by the control system, including the TPIM 19, to control the motors A and B. Individual motor speed signals, $N_A$ and $N_B$ for Motor A and Motor B respectively, are derived by the TPIM 19 from the motor phase information or conventional rotation sensors. The TPIM 19 determines and communicates motor speeds, $N_A$ and $N_B$, to the HCP 5. The electrical energy storage device 74 is high-voltage DC-coupled to the TPIM 19 via DC lines 27. Electrical current is transferable to or from the TPIM 19 in accordance with whether the ESD 74 is being charged or discharged.

Each of the aforementioned controllers is preferably a general-purpose digital computer generally comprising a microprocessor or central processing unit, read only memory (ROM), random access memory (RAM), electrically programmable read only memory (EPROM), high speed clock, analog to digital (A/D) and digital to analog (D/A) circuitry, and input/output circuitry and devices (I/O) and appropriate signal conditioning and buffer circuitry. Each controller has a set of control algorithms, in the form of algorithmic code 111 comprising resident program instructions and calibrations stored in ROM and executed to provide the respective functions of each computer. Information transfer between the various computers is preferably accomplished using the aforementioned LAN 6.

Algorithms for control and state estimation in each of the controllers are typically executed during preset loop cycles such that each algorithm is executed at least once each loop cycle. Algorithms stored in the non-volatile memory devices are executed by one of the central processing units and are operable to monitor inputs from the sensing devices and execute control and diagnostic routines to control operation of the respective device, using preset calibrations. Loop cycles are typically executed at regular intervals, for example each 3, 6.25, 15, 25 and 100 milliseconds during ongoing engine and vehicle operation. Alternatively, algorithms may be executed in response to occurrence of an event.

In response to an operator's action, as captured by the UI 13, the supervisory HCP controller 5 and one or more of the other controllers determine required transmission output torque, $T_O$. Selectively operated components of the hybrid transmission 10 are appropriately controlled and manipulated to respond to the operator demand. For example, in the exemplary embodiment shown in FIGS. 1 and 2, when the operator has selected a forward drive range and manipulates either the accelerator pedal or the brake pedal, the HCP 5 determines an output torque for the transmission, which affects how and when the vehicle accelerates or decelerates. Final vehicle acceleration is affected by other factors, including, e.g., road load, road grade, and vehicle mass. The HCP 5 monitors the parametric states of the torque-generative devices, and determines the output of the transmission required to arrive at the desired torque output. Under the direction of the HCP 5, the transmission 10 operates over a range of output speeds from slow to fast in order to meet the operator demand.

The two-mode, compound-split, electro-mechanical hybrid transmission, includes output member 64 which receives output power through two distinct gear trains within the transmission 10, and operates in several transmission operating modes, described with reference now to FIG. 1, and Table 1, below.

TABLE 1

| Transmission Operating Mode | Actuated Clutches | |
| --- | --- | --- |
| Mode I | C1 70 | |
| Fixed Ratio 1 | C1 70 | C4 75 |
| Fixed Ratio 2 | C1 70 | C2 62 |
| Mode II | C2 62 | |
| Fixed Ratio 3 | C2 62 | C4 75 |
| Fixed Ratio 4 | C2 62 | C3 73 |

The various transmission operating modes described in the table indicate which of the specific clutches C1, C2, C3, C4 are engaged or actuated for each of the operating modes. Additionally, in various transmission operating modes, Motor A 56 or Motor B 72 may each operate as electrical motors, designated as MA, MB respectively, and whether motor A 56 is operating as a generator, designated as GA. A first mode, or gear train, is selected when the torque transfer device 70 is actuated in order to "ground" the outer gear member 46 of the third planetary gear set 28. A second mode, or gear train, is selected when the torque transfer device 70 is released and the torque transfer device 62 is simultaneously actuated to connect the shaft 60 to the carrier 52 of the third planetary gear set 28. Other factors outside the scope of the invention affect when the electrical machines 56, 72 operate as motors and generators, and are not discussed herein.

The control system, shown primarily in FIG. 2, is operable to provide a range of transmission output speeds, $N_O$, of shaft 64 from relatively slow to relatively fast within each mode of operation. The combination of two modes with a slow-to-fast output speed range in each mode allows the transmission 10 to propel a vehicle from a stationary condition to highway speeds, and meet various other requirements as previously described. Additionally, the control system coordinates operation of the transmission 10 so as to allow synchronized shifts between the modes.

The first and second modes of operation refer to circumstances in which the transmission functions are controlled by one clutch, i.e. either clutch C1 70 or C2 62, and by the controlled speed and torque of the motor/generators 56 and 72. Certain ranges of operation are described below in which fixed ratios are achieved by applying an additional clutch. This additional clutch may be clutch C3 73 or C4 75, as shown in the table, above.

When the additional clutch is applied, fixed ratio of input-to-output speed of the transmission, i.e. $N_I/N_O$, is achieved. The rotations of the motor/generators 56, 72 are dependent on internal rotation of the mechanism as defined by the clutching and proportional to the input speed, $N_I$, determined or measured at shaft 12. The motor/generators function as motors or generators. They are completely independent of engine to output power flow, thereby enabling both to be motors, both to function as generators, or any combination thereof. This allows, for instance, during operation in Fixed Ratio 1 that motive power output from the transmission at shaft 64 is provided by power from the engine and power from Motors A and B, through planetary gear set 28 by accepting power from the energy storage device 74.

The transmission operating mode can be switched between Fixed Ratio operation and Mode operation by activating or deactivating one the additional clutches during Mode I or Mode II operation. Determination of operation in fixed ratio or mode control is by algorithms executed by the control system, and is outside the scope of this invention.

The modes of operation may overlap the ratio of operation, and selection depends again on the driver's input and response of the vehicle to that input. RANGE 1 falls primarily within mode I operation when clutches C1 70 and C4 75 are engaged. RANGE 2 falls within mode I and mode II when clutches C2 62 and C1 70 are engaged. A third fixed ratio range is available primarily during mode II when clutches C2 62 and C4 75 are engaged, and a fourth fixed ratio range is available during mode II when clutches C2 62 and C3 73 are engaged. It is notable that ranges of operation for Mode I and Mode II typically overlap significantly.

Output of the exemplary powertrain system described hereinabove is constrained due to mechanical and system limitations. The output speed, $N_O$, of the transmission measured at shaft 64 is limited due to limitations of engine output speed, $N_E$, measured at shaft 18, and transmission input speed, $N_I$, measured at shaft 12, and speed limitations of the electric motors A and B, designated as $+/-N_A$, $+/-N_B$. Output torque, $T_O$, of the transmission 64 is similarly limited due to limitations of the engine input torque, $T_E$, and input torque, $T_I$, measured at shaft 12 after the transient torque damper 20, and torque limitations ($T_{A\_MAX}$, $T_{A\_MIN}$, $T_{B\_MAX}$, $T_{B\_MIN}$) of the motors A and B 56, 72.

In operation, a shift occurs in the exemplary transmission due to a change in operator demand for output torque, typically communicated through inputs to the UI 13, including the accelerator pedal, the brake pedal, the transmission gear selector, and, the vehicle speed cruise control system. Additionally, a change in demand for output torque may be predicated on a change in external conditions, including, e.g. changes in road grade, road surface conditions, or wind load. Furthermore, a change in demand for output torque may be predicated on a change in powertrain torque demand caused by a controller command to change one of the motor/generators between electrical energy generating mode and torque generating mode. The distributed control architecture acts in concert to determine a need for a change in transmission operating gear, and executes the forgoing to effect the change in gear.

In overall operation, executing a synchronous shift from an initial fixed gear to a final fixed gear in the exemplary transmission of the exemplary powertrain system comprises operating the transmission in an initial fixed gear ratio, and, when a shift is commanded, transitioning the transmission to operate in mode operation, as previously described. Synchronous shifting is characterized in that relative speed between reactive clutch plates and friction plates is substantially equal to zero, allowing for signal noise at the sensors. Shifting to Mode operation in this situation is accomplished by deactivating one of the two currently actuated clutches. The transmission operates in Mode operation, i.e. Mode I or Mode II, until rotational speed of the input shaft 12 is synchronized with a rotational speed of another one of the torque-transfer devices, or clutches. The torque-transfer device is actuated when the speeds are synchronized, and the transmission is operated at a final fixed gear ratio.

Figure 3:
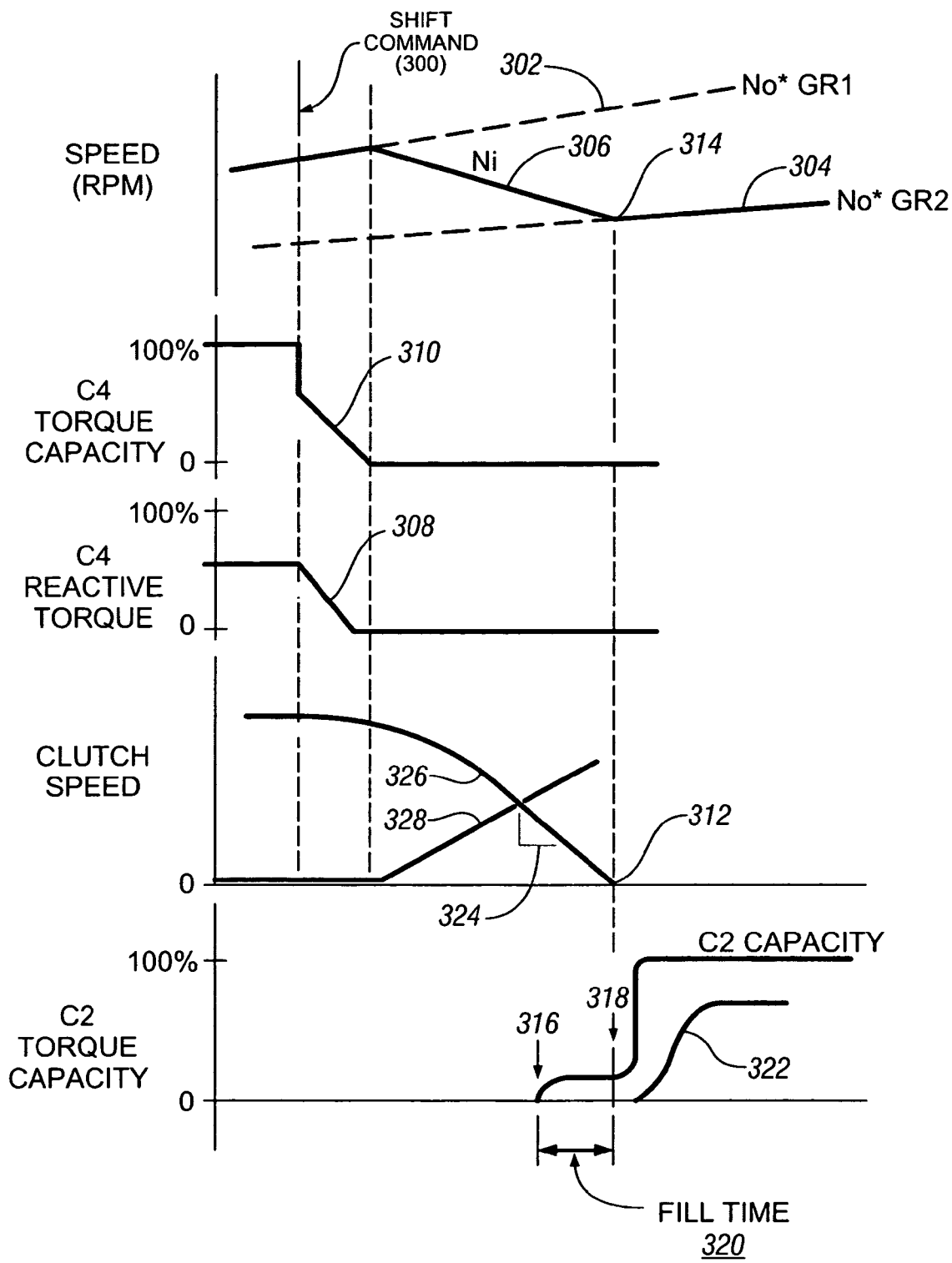
FIG. 3 is an exemplary data graph, in accordance with the present invention.

Referring now to FIG. 3, a graphical depiction of an exemplary synchronous gear shifting event executed by the aforementioned powertrain and driveline system and controller architecture is now described. It is understood that application-specific masses, inertias, friction factors, and other characteristics and parameters of the driveline affect various powertrain and driveline operating states, and therefore the response times and magnitudes are intended to be exemplary, while still descriptive of the overall operation of the powertrain system. The X-axis comprises a time measurement, and the Y-axis comprises various control commands and measured parameters, each plotted as a function of time on the X-axis. The line depicted as 302 comprises input speed, $N_I$, when the powertrain is operating in a fixed gear, Gear 1, wherein clutches C1 and C4 are actuated. When clutches C1 and C4 are actuated, input speed $N_I$, is equal to output speed, $N_O$, multiplied by a first gear ratio, GR1, i.e., $N_O*GR1$. The line depicted as 304 comprises input speed when the powertrain is operating in fixed gear, Gear 2, wherein clutches C1 and C2 are actuated. When clutches C1 and C2 are actuated, input speed $N_I$, is equal to output speed, $N_O$, multiplied by a second gear ratio, GR2, i.e. $N_O*GR2$. The line depicted as 306 shows input speed, $N_I$, plotted as a function of time, while the transmission transitions from first fixed gear ratio, to mode operation, and into second fixed gear ratio. This transition is now described.

The distributed control architecture is operable to execute a synchronous speed shift from an initial gear, in this instance, Gear 1, to a final gear, in this instance Gear 2, in the exemplary two-mode, compound-split, electro-mechanical hybrid transmission embodying the concepts of the present invention depicted in FIG. 1. As previously described, the powertrain system comprises torque-generative devices 14, 56, 72 operable to supply motive torque to the transmission device 10. As previously described, the transmission device 10 comprises a plurality of gears and torque-transfer devices operable to transmit torque between the torque-generative devices 14, 56, 72 and the output shaft 64 and drive wheels 96 of the driveline. Torque transmission may comprise transfer of motive torque from one or more of the torque-generative devices 14, 56, 72 to the driveline. Torque transmission may comprise transfer of torque from the drive wheels 96 via the driveline and transmission to one or more of the torque-generative devices 14, 56, 72 as a result of a process commonly referred to as engine-braking. In this configuration, engine-braking comprises transmitting at least a portion of driveline torque resulting from vehicle momentum from the output shaft 64 through torque-transfer devices, i.e., clutches C1, C2, C3, C4, to the torque-generative devices 14, 56, 72. The transmitted torque is absorbed by the powertrain in the form of electrical energy generation through the motor/generators 56, 72, and, engine braking through the internal combustion engine 14.

Reactive torque is defined as a magnitude of torque transmitted through a torque-transfer device, i.e. a clutch. Torque capacity is defined as a maximum amount of torque transmissible across a clutch, and is generally based upon magnitude of clutch pressure and clutch friction. When the magnitude of clutch torque exceeds the torque capacity, clutch slip occurs. The reactive torque is always less than or equal to the torque capacity. Clutch pressure is created by controlling magnitude of hydraulic pressure applied to the clutch by the hydraulic circuit of the transmission.

In operation, one or more of the controllers is operable to execute the algorithmic code 111 including algorithms to accomplish the forgoing tasks to achieve synchronous gear shifting. In this exemplary description, the first clutch is clutch C4, which is activating the initial gear, in this case Gear 1 or G1.

Figure 4:
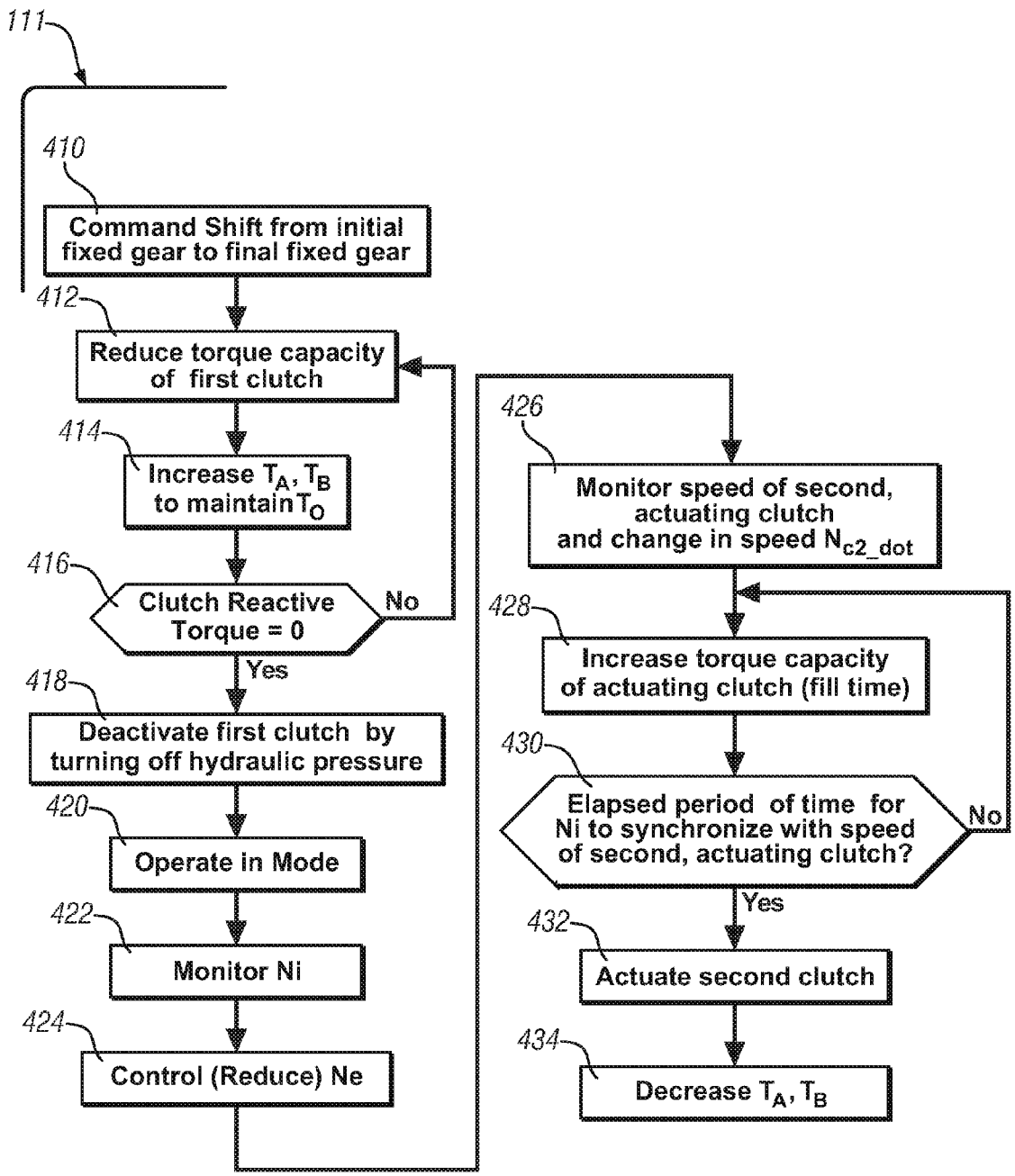
FIG. 4 is an algorithmic flowchart, in accordance with the present disclosure.

FIG. 4 shows a flowchart depicting the algorithmic code 111 for effecting the synchronous shift graphically depicted in FIG. 3 from an initial fixed gear to a final fixed gear in the hybrid transmission 10. In response to a shift command 300 from the controller architecture (410), torque capacity of the first clutch, shown as line 310, is reduced by reducing hydraulic pressure to the first clutch (412). As torque capacity is reduced, it becomes equal to magnitude of reactive torque (Line 308) of the first clutch.

In order to reduce reactive torque to the first clutch C4 without adversely affecting torque output, $T_o$, of the powertrain, the TPIM controller is commanded to transfer sufficient quantity of electrical energy to electric motors A 56 and B 72 such that their outputs or motive torques, $T_A$ and $T_B$, are equal to the reactive torque across the first clutch, C4, and thus able to maintain the output torque, $T_o$, at shaft 64 of the transmission (414).

Torque outputs of electric motors A 56 and B 72 are concurrently increased with continued decrease in clutch torque capacity 310 and reactive torque 308. When the output torques, $T_A$ and $T_B$ are sufficiently able to maintain the output torque, $T_o$, then the reactive torque across Clutch C4 is essentially equal to zero (416). When the reactive torque across Clutch C4 is substantially equal to zero, the hydraulic pressure actuating the first clutch, C4, can be turned off with no instantaneous change in torque across clutch plates of the first clutch, C4 (418). This action improves clutch durability, and reduces driveline vibrations associated with abrupt clutch actuations and deactivations. The torque capacity is reduced by reducing torque pressure, which is accomplished by controlling the hydraulic pump 88 and the clutch pressure control solenoid (not shown) for Clutch C4.

The first clutch, C4, is subsequently deactivated, or disengaged, when the reactive torque is less than a predetermined value. In this application, the preferable predetermined value for a reactive torque at which the first clutch can be deactivated is a reactive torque value that is substantially nil (416). When the first clutch, C4, is deactivated (418), the powertrain system begins Mode operation (420). Mode operation comprises operating the electrical motors A 56 and B 72 with a single clutch actuated, in this case C1 to provide motive torque to the transmission.

Input shaft 12 speed, i.e. $N_I$, is preferably determined by monitoring speed of shaft 12, or other parameters, to determine when it is substantially synchronized with rotational speed of the second clutch, in this case C2 (422). Engine speed, $N_E$, is reduced in a controlled manner by the control system (424). When the rotational speeds of input shaft 12 and the second clutch are determined to be substantially synchronized, at point 314 (430), the second clutch, C2 is actuated (point 312) (432). To be substantially synchronized is defined such that a difference in rotational speeds falls within a range of about one radian per second, or, alternatively, within 10 revolutions per second, to accommodate sensor signal noise.

Synchronously actuating the second clutch, C2, is accomplished as follows. When in mode operation, rotational speeds of clutches C2 and C4, depicted as lines 326 and 328, are known. Change in rotational speed of clutch C2 is also known, described as $N_{C2}$ dot, and depicted as 324 (426). The control system preferably uses simple algebra to combine the known rotational speed of clutch C2 at a point in time, and the change in rotational speed of clutch C2, $N_{C2}$ dot, to determine an elapsed period of time necessary for rotational speeds of the reaction and friction plates of clutch C2 to be substantially equivalent. This is shown as Point 314. When such conditions are reached, rotational speed of the input shaft is substantially synchronized with rotational speed of clutch C2 (430). This comprises a point at which actuation of clutch C2 can be accomplished without inducing torque disturbances in the driveline.

There is a time lag from when a command to actuate a flow control solenoid to increase torque capacity of clutch C2 until the clutch C2 can begin to apply reactive torque, due to various system factors. The time lag is referred to as 'fill time', shown as 320, and is typically in the range of 300 milliseconds (428).

The control system is able to subtract fill time 320 from the point 314 at which speed of the relative rotational speed of the reaction and friction plates of clutch C2 are substantially synchronous, which is shown as 316. At or before time point 316, the control system commands flow of pressurized hydraulic fluid to the second clutch to increase torque capacity of clutch C2. Flow of pressurized hydraulic fluid is accomplished by actuating a flow control solenoid contained within the transmission 10. The flow control solenoid is an element of a hydraulic fluid circuit that is operable to deliver pressurized hydraulic fluid to various solenoids and other devices, as commanded by the transmission controller 17.

At or after time point 314 the torque capacity for the second clutch, C2, shown as 312, is increased by increasing system hydraulic pressure thereto, and clutch C2 can be actuated by applying reactive torque, shown as 322 (432). Torque contributions of Motors A and B are reduced as the magnitude of reactive torque of clutch C2 increases, and the system transitions from mode operation to fixed gear operation, as previously discussed (434).

This embodiment describes a shift between Gear 1 and Gear 2. It is understood that other gear changes, both to increase gear ratio and to decrease a gear ratio, are similarly executed and fall within the scope of the invention. It is also understood that modifications in the transmission hardware are allowable within the scope of the invention. The invention has been described with specific reference to the preferred embodiments and modifications thereto. Further modifications and alterations may occur to others upon reading and understanding the specification. It is intended to include all such modifications and alterations insofar as they come within the scope of the invention.

Having thus described the invention, it is claimed:

1. Article of manufacture, comprising a computer readable storage medium having a computer program encoded therein for effecting a method to execute a shift in a transmission of a powertrain system, the powertrain system comprising a plurality of torque-generative devices operable to supply motive torque to the transmission device, the transmission device comprising a plurality of gears and a plurality of torque-transfer devices, wherein torque is transmitted between the transmission device and an output shaft through actuation of at least one of the torque-transfer devices, the computer program comprising:
   code for operating the transmission in an initial fixed ratio operation including actuation of a first torque-transfer device and a second torque-transfer device;
   code for reducing reactive torque of the first torque-transfer device;
   code for deactivating the first torque-transfer device when the reactive torque of the first torque-transfer device is less than a predetermined value;
   code for operating the transmission in a mode operation including actuation of the second torque-transfer device;
   code for determining rotational speed of an input shaft to the transmission is substantially synchronized with a rotational speed of a third torque-transfer device when operating the transmission in the mode operation; and
   code for actuating the third torque-transfer device when the rotational speed of the input shaft to the transmission is substantially synchronized with the rotational speed of the third torque-transfer device to operate the transmission in a final fixed ratio operation, including actuation of the second torque-transfer device and the third torque-transfer device.

2. The article of manufacture of claim 1, wherein code for actuating the third torque-transfer device further comprises:
   code for increasing torque capacity of the third torque-transfer device; and
   code for increasing a reactive torque of the third torque-transfer device.

3. The article of manufacture of claim 2, wherein code for increasing torque capacity of the third torque-transfer device comprises: code for commanding fluid flow through a hydraulic system to actuate the third torque-transfer device at a time prior to a time when the rotational speed of the input shaft to the transmission is substantially synchronized with the rotational speed of the third torque-transfer device.

4. The article of manufacture of claim 3, wherein code for commanding fluid flow through the hydraulic system to actuate the third torque-transfer device at a time prior to a time when the rotational speed of the input shaft to the transmission is substantially synchronized with rotational speed of the third torque-transfer device comprises:
   code for monitoring rotational speed of the third torque-transfer device; and
   code for determining an elapsed period of time when the rotational speed of the input shaft is to be substantially synchronized with rotational speed of the third torque-transfer device based upon a change in rotational speed of the third torque-transfer device.

5. The article of manufacture of claim 2, wherein the code for increasing torque capacity of the second torque-transfer device comprises actuating a clutch control solenoid configured to actuate the second torque transfer device.

6. The article of manufacture of claim 1, wherein the plurality of torque-generative devices configured to supply motive torque to the transmission device comprises a first and a second electric motor.

7. The article of manufacture of claim 6, wherein code for reducing reactive torque of a first torque-transfer device comprises:
   code for transmitting a magnitude of motive torque to the transmission from the first and the second electric motors substantially equal to the reactive torque of the first torque-transfer device to maintain an output shaft torque; and
   code for reducing torque capacity of the first torque-transfer device to a torque value that is less than a predetermined reactive torque value.

8. The article of manufacture of claim 6 further comprising: code for reducing the magnitude of motive torque to the transmission from the first and second electric motors subsequent to actuating the third torque-transfer device.

9. The article of manufacture of claim 6, wherein the predetermined reactive torque value comprises a torque value substantially equal to a nil torque value.

10. The article of manufacture of claim 1, wherein the shift from the initial fixed ratio operation to the final fixed ratio operation in the transmission is predicated upon a change in operator demand for output torque.

11. The article of manufacture of claim 1, wherein the shift from an initial gear to a final gear in the transmission is predicated upon a change in external conditions.

12. The article of manufacture of claim 1, wherein the shift from an initial gear to a final gear in the transmission is predicated upon a change in powertrain torque demand resulting from a controller command to change operating mode of one of the torque-generative devices between an electrical energy generating mode and a torque generating mode when the one of the torque-generative devices comprises a motor/generator.

13. The article of manufacture of claim 1, wherein the plurality of torque-generative devices configured to supply motive torque to the transmission device comprises a first and a second electrical motor/generator.

14. The article of manufacture of claim 13, wherein the plurality of torque-generative devices configured to supply motive torque to the transmission device further comprises an internal combustion engine operably connected to the input shaft.

15. The article of manufacture of claim 14, wherein each of the torque-generative devices is configured to independently supply motive torque to the transmission device.

16. Method to execute a shift from an initial gear to a final gear in a transmission of a powertrain system, the powertrain system comprising a plurality of torque-generative devices each operable to supply motive torque to the transmission device, the transmission device comprising a plurality of gears and a plurality of torque-transfer devices, wherein torque is transmitted between the transmission device and an output shaft through actuation of at least one of the plurality of torque-transfer devices, comprising:

operating the transmission in an initial fixed ratio operation gear including actuation of a first torque-transfer device and a second torque-transfer device;

reducing reactive torque of the first torque-transfer device;

deactivating the first torque-transfer device when the reactive torque of the first torque-transfer device is less than a predetermined value;

operating the transmission in a mode operation including actuation of the second torque-transfer device;

determining rotational speed of an input shaft to the transmission is substantially synchronized with a rotational speed of a third torque-transfer device when operating the transmission in the mode operation; and actuating the third torque-transfer device when the rotational speed of the input shaft to the transmission is substantially synchronized with the rotational speed of the third torque-transfer device to operate the transmission in a final fixed ratio operation, including actuation of the second torque-transfer device and the third torque-transfer device.

17. The method of claim 16, further comprising transitioning from the initial fixed gear ratio to the mode operation when the reactive torque of the first torque-transfer devices actuating the initial fixed gear ratio is less than a predetermined reactive torque value.

18. The method of claim 17, wherein transitioning from the initial fixed gear ratio to the mode operation comprises deactivating the first torque-transfer device having the reactive torque less than the predetermined reactive torque value.

19. The method of claim 18, wherein the predetermined reactive torque value comprises a torque value substantially equal to a nil torque value.

* * * * *